United States Patent [19]
Schneider et al.

[11] Patent Number: 5,627,354
[45] Date of Patent: May 6, 1997

[54] SYSTEM FOR HANDLING SHEET FILM

[75] Inventors: Rudolf Schneider, Pfaffenhofen; Georg Lechner, Aying; Thomas Zehetmaier, Naufarn; Michael Reichart, München, all of Germany; Frans Feytens, Meise; Gilbert Hersschens, Mol, both of Belgium

[73] Assignee: Agfa-Gevaert AG, Leverkusen, Germany

[21] Appl. No.: 536,439

[22] Filed: Sep. 29, 1995

[30] Foreign Application Priority Data

Oct. 14, 1994 [DE] Germany ............ 44 36 835.6

[51] Int. Cl.$^6$ .................................................. G03C 3/00
[52] U.S. Cl. ........................... 235/375; 399/1; 396/377
[58] Field of Search ........................ 235/375; 355/202, 355/203, 72, 209; 354/21, 276

[56] References Cited

U.S. PATENT DOCUMENTS

| | | | |
|---|---|---|---|
| 3,637,279 | 1/1972 | Brooks | 312/303 |
| 3,954,477 | 5/1976 | Arisaka et al. | 96/76 R |
| 4,094,726 | 6/1978 | Houjer et al. | 156/502 |
| 4,909,389 | 3/1990 | Plessers et al. | 206/451 |
| 5,089,691 | 2/1992 | Morisaki et al. | 235/375 |
| 5,154,410 | 10/1992 | Barder et al. | 271/188 |
| 5,231,656 | 7/1993 | Sakuma et al. | 378/166 |

FOREIGN PATENT DOCUMENTS

| | | |
|---|---|---|
| 280053 | 8/1988 | European Pat. Off. . |
| 0280053A3 | 8/1988 | European Pat. Off. . |
| 313686 | 5/1989 | European Pat. Off. . |
| 0313686A1 | 5/1989 | European Pat. Off. . |
| 0475176A2 | 3/1992 | European Pat. Off. . |
| 475176 | 3/1992 | European Pat. Off. . |
| 0500277A2 | 8/1992 | European Pat. Off. . |
| 500277 | 8/1992 | European Pat. Off. . |

OTHER PUBLICATIONS

Patent Abstracts of Japan, P 1014, Feb. 28, 1990, vol. 14/No. 111.

*Primary Examiner*—Donald T. Hajec
*Assistant Examiner*—Douglas X. Rodriguez
*Attorney, Agent, or Firm*—Darby & Darby

[57] ABSTRACT

A stack of individual sheets of film is enclosed by lightproof plastic packaging. An opaque sheet is disposed at the bottom of the stack, and the side of the opaque sheet confronting the packaging is provided with a bar code containing information about the film. The packaging is removed in a lighttight area of a processing unit for the film and the bar code is read. The opaque sheet prevents the radiation used to read the bar code from reaching the film. The information retrieved from the bar code is employed to control processing of the film.

21 Claims, 4 Drawing Sheets

SYSTEM FOR HANDLING SHEET FILM

BACKGROUND OF THE INVENTION

The invention relates to a system for handling photosensitive material.

A digital imaging system is known, for example, from the European Patent Application 0 500 277. In this system, images are recorded on sheet film by means of a laser. The exposure and subsequent development of the film are controlled in dependence upon the film parameters. To this end, the packaging for the film is provided with a bar code containing data such as the sensitivity of the film, the film format, etc. When the packaging is opened, the bar code is read and the imaging system operated in accordance with the data stored in the code.

A drawback is that the bar code is fixed on the packaging. Accordingly, it is not suitable for packaging which is removed from the film completely, e.g., packaging such as disclosed in the European Patent Application 0 313 686. With packaging of this type, the bar code is likewise removed from the film and thereafter is no longer readable.

From U.S. Pat. No. 5,231,656, it is known to expose a bar code directly onto sheets of x-ray film. The data stored in the bar code is then used for processing of the film. This system has the drawback that the bar code covers a usable area of the film. Such area is then no longer available for an image.

SUMMARY OF THE INVENTION

It is an object of the invention to relate photosensitive material to information about the same without affixing the information to packaging for the photosensitive material.

Another object of the invention is to relate information about photosensitive material to the latter without applying the information to the photosensitive material.

An additional object of the invention is to provide a method which enables photosensitive material to be related to information about the same without affixing the information to packaging for the photosensitive material or applying the information to the photosensitive material.

The preceding objects, as well as others which will become apparent as the description proceeds, are achieved by the invention.

One aspect of the invention resides in a system for handling photosensitive material. The system comprises a lightproof receptacle enclosing the photosensitive material, and a data carrier provided with information about the photosensitive material. The carrier is discrete from, and enclosed in, the receptacle.

The photosensitive material can, for instance, be constituted by sheets of film, and the receptacle may be in the form of flexible packaging. The packaged film can be placed in a receiver or magazine in light. The magazine may be insertable in a film processing unit and may be designed to allow removal of the packaging from the film under lighttight conditions.

The carrier is preferably opaque to light of at least one wavelength and, advantageously, is impervious to light of all wavelengths which can affect the film. By placing the carrier between the film and the packaging and positioning the packaged film in the magazine with the carrier below the film, the carrier can protect the film against light from below following removal of the packaging. The information borne by the carrier, which can be in the form of a bar code, is favorably disposed on the side of the carrier which faces the packaging. This allows the code to be read from below without affecting the film.

Additional features and advantages of the invention will be forthcoming from the following detailed description of preferred embodiments when read in conjunction with the accompanying drawings.

DESCRIPTION OF THE PREFERRED EMBODIMENTS

Figure 1:
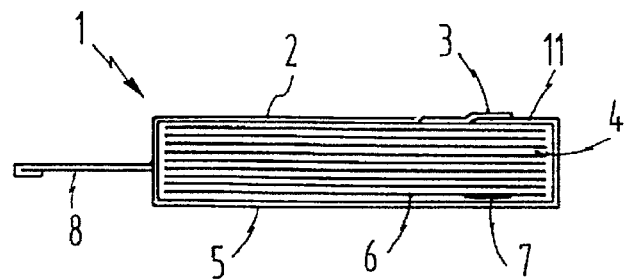
FIG. 1 illustrates a packet of photosensitive material.

Referring to FIG. 1, the numeral 1 generally identifies a packet of photosensitive material. The photosensitive material is here assumed to be constituted by sheets of film which form a stack 4. The film stack 4 is enclosed in a lightproof receptacle or lightproof packaging 5. The packaging 5 here consists of fusion weldable plastic which is tear-resistant, flexible and elastic and has a low coefficient of friction. By way of example, a black polyethylene foil can be used for the packaging 5.

The sheets of film making up the stack 4 may be sheets of x-ray film. The sheets of the stack 4 may also be constituted by film on which images can be formed by a cathode ray tube or by a modulated, scanning laser.

The packaging 5 has an outwardly projecting, free tongue 8. The tongue 8 permits the packaging 5 to be removed from the film stack 4 in a daylight film magazine to be described below. A marginal portion 11 of the packaging 5 is folded over onto the top side 2 of the packaging 5 and is held against the top side 2 by an adhesive strip 3. The marginal portion 11 and adhesive strip 3 function to seal the packaging 5 so that the packaging 5 is lightproof. If the tongue 8 is pulled, the marginal portion 11 is drawn away from the adhesive strip 3 and the packaging 5 can be removed from the film stack 4.

A carrier sheet 6 is confined in the film packet 1 and lies at the bottom of the film stack 4 between the latter and the packaging 5. The carrier sheet 6 is impervious to light of at least one specific wavelength and is preferably opaque to light of any wavelength which can affect the sheets of the stack 4. The carrier sheet 6 is assumed to consist of cardboard but can be made of any other suitable material, e.g., plastic. A bar code 7 is provided on the side of the carrier sheet 6 which confronts the packaging 5. The bar code 7, which contains data or information relating to the sheets of the film stack 4, is situated at a predetermined position of the carrier sheet 6. The bar code 7 can be printed directly on the carrier sheet 6 or can be printed on a sticker which is adhesively applied to the carrier sheet 6.

Figure 2:
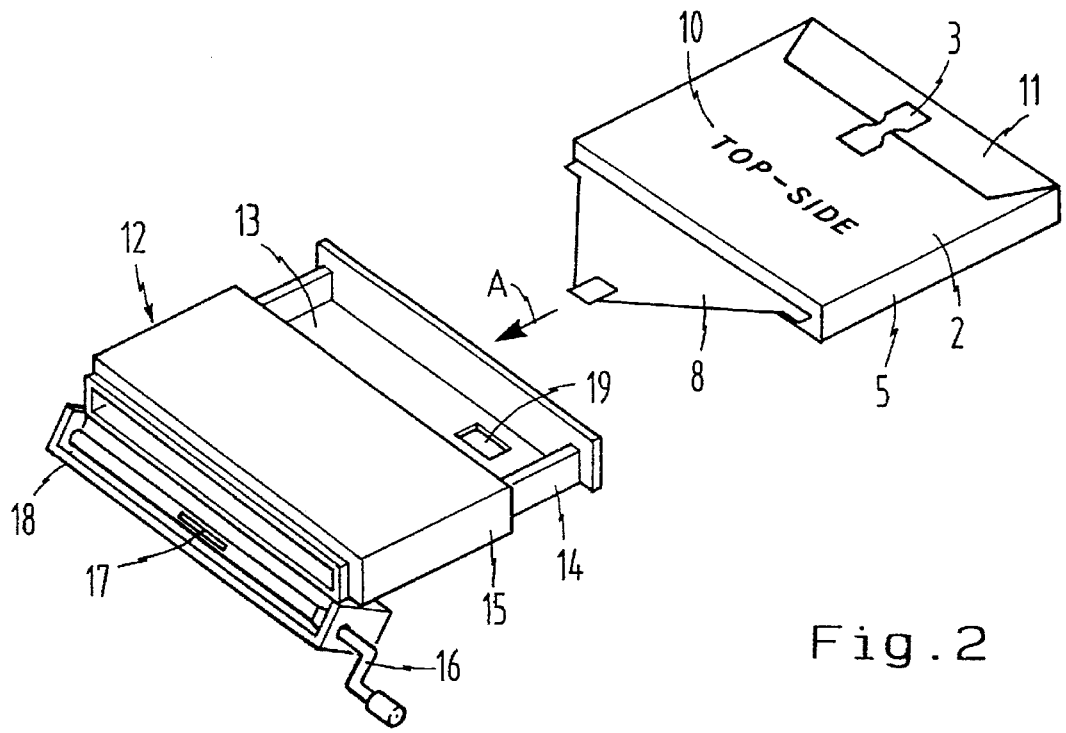
FIG. 2 shows a magazine for the packet.

As seen in FIG. 2, the top side 2 of the film packet 1 is provided with identification 10. The identification 10 is here in the form of a legend "TOP SIDE" but could also be a mark or symbol. The identification 10 may be placed on the bottom side of the film packet 1 in lieu of or in addition to the top side 2.

FIG. 2 further shows a storage container or receiver 12 for the film packet 1. The storage container 12 is illustrated as a portable film magazine but could just as well be built into a film processing unit.

The film magazine 12 has a section 15 which constitutes a frame or support and a section 14 which is mounted on the frame 15 like a drawer. The drawer 14 can be pushed into the frame 15 to assume a closed position in which the frame 15 covers the drawer 14, and the drawer 14 can likewise be pulled out of the frame 15 to assume an open position in which interior of the drawer 14 is accessible. The drawer 14, which has a compartment 13 for the film packet 1, can be locked to and unlocked from the frame 15. To insert the film packet 1 in the film magazine 12, the drawer 14 is opened and the film packet 1 is introduced into the compartment 13 by moving the film packet 1 in a direction A with the tongue 8 leading. Thus, after the film packet 1 has been placed in the drawer 14 and the drawer 14 has been closed, the tongue 8 is located to the back of the drawer 14 and the frame 15.

The movable drawer 14 can be eliminated and the frame 15 formed with an internal chamber for the film packet 1. Under such circumstances, the frame 15 may be provided with a flap for insertion of the film packet 1 into the internal chamber.

A winding unit 18 is mounted at the back of the frame 15 and is pivotable between an open position and a closed position. In the closed position, light is unable to penetrate the film magazine 12 via the winding unit 18. The winding unit 18 includes a shaft or spool 17 which is driven in rotation by a hand crank 16. Following insertion of the film packet 1 in the frame 15, the tongue 8 is attached to the spool 17. At this time, the winding unit 18 is open. The tongue 8 can be attached to the spool 17 using Velcro (trademark) or a clamping arrangement. Once the tongue 8 has been attached to the spool 17, the winding unit 18 is closed so that the film magazine 12 is lighttight in the region of the winding unit 18. The drawer 14 is likewise closed if this has not been done previously.

After the winding unit 18 and the drawer 14 have been closed, the crank 16 is rotated thereby causing the tongue 8 to be wound onto the spool 17. Consequently, the marginal portion 11 of the packaging 5 is pulled away from the adhesive strip 3 and the packaging 5 is progressively wound around the spool 17. In this manner, the packaging 5 is removed from the film stack 4.

The bottom of the drawer 14 is provided with an opening or window 19. The opening 19 is situated at the location where the bar code 7 comes to rest upon insertion of the film packet 1 in the drawer 14. The carrier sheet 6 lies on the bottom of the drawer 14 following removal of the packaging 5 from the film stack 4, and the bar code 7 is in register with the opening 19.

Figure 3:
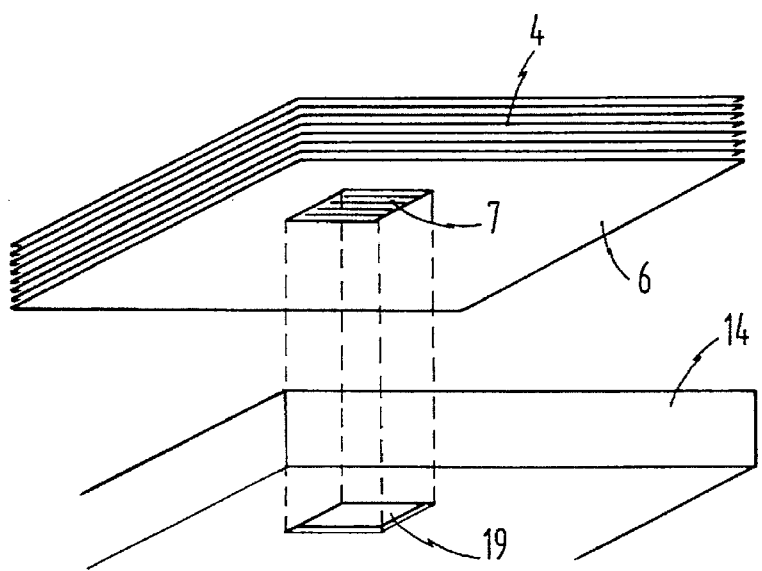
FIG. 3 illustrates the packet after the latter has been opened.

FIG. 3 shows the orientation of the bar code 7 relative to the film stack 4, the drawer 14 and the opening 19.

Figure 4:
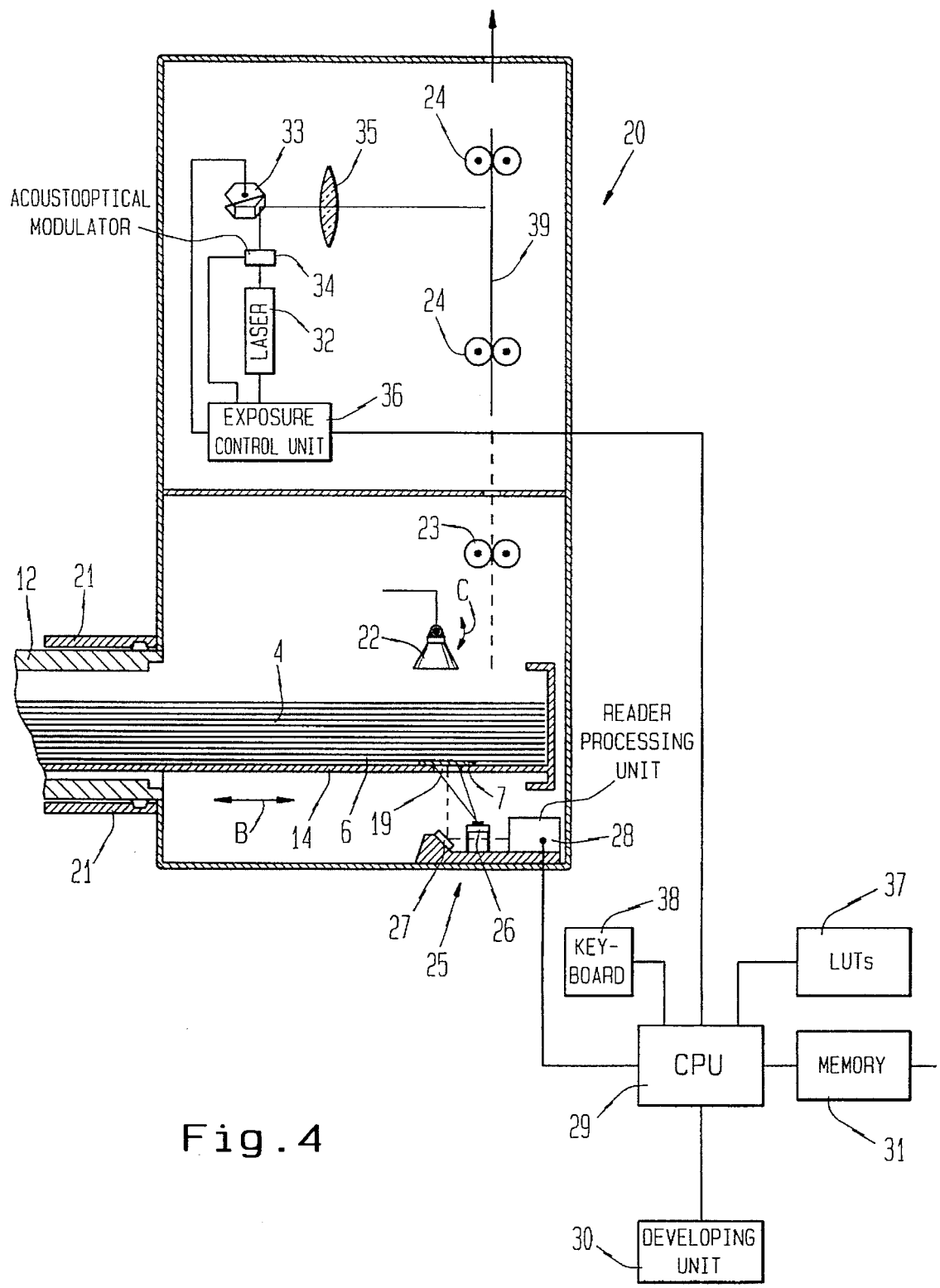
FIG. 4 shows an exposure unit for photosensitive material.

FIG. 4 illustrates a film processing unit which includes a laser imaging or exposure unit 20. The laser imaging unit 20 has a holder 21 for the film magazine 12, and the holder 21 is designed so that the film magazine 12 is insertable in the laser imaging unit 20 by pushing the film magazine 12 into the holder 2. The film magazine 12 can be releasably locked in the holder 21. Instead of making the film magazine 12 separable from the laser imaging unit 20, the film magazine 12 can be fixedly mounted in the holder 21 or another holder of the laser imaging unit 20. In either case, it is important that the connection between the film magazine 12 and the laser imaging unit 20 be lightproof so that no light can fall on the drawer 14 or the film stack 4 when the drawer 14 is open. The drawer 14 is opened and closed by moving the drawer 14 in the directions indicated by the double-headed arrow B. A suction device including a suction head 22 is disposed inside the laser imaging unit 20. In the open position of the drawer 14 shown in FIG. 4, the suction head 22 can remove the sheets of film from the film stack 4 one-by-one. The suction head 22 draws the uppermost sheet of film from the film stack 4, rotates the sheet of film as indicated by the arrow C so that the orientation of the sheet is changed from horizontal to vertical, and feeds the sheet of film to a pair of transporting rollers 23.

The laser imaging unit 20 further includes a bar code reader or reading device 25. The bar code reader 25 is situated at a level below the holder 21 and hence is located beneath the drawer 14 when the latter is in its open position. The bar code reader 25 includes an illuminating device or source of illumination 26 which may, for instance, be constituted by a row of light-emitting diodes 26 having a wavelength of 660 nm. The bar code reader 25 further includes a reflector 27 and a processing unit 28. The processing unit 28 is conventional and comprises optical elements, a light-sensitive receiver and an electronic data processor. The bar code reader 25 is positioned so that its effective scanning range coincides with the window 19 of the drawer 14 when the drawer 14 is in a predetermined open position. In such position, the bar code reader 25 can read the bar code 7 on the carrier sheet 6. The carrier sheet 6 shields the film stack 4 from the illuminating source 26 so that the light from the source 26 cannot impinge the film stack 4.

The bar code 7 contains data relating to the film stack 4. By way of example, the information stored in the bar code 7 may include the manufacturer, film format, sensitometric data, date of manufacture, film type and expiration date. The data stored in the bar code 7 and read by the bar code reader 25 can be sent to a central processing unit or controller 29. The central processing unit 29 controls apparatus or devices used in processing the sheets of film of the film stack 4, e.g., an exposure control unit 36 of the laser imaging unit 20, a photographic developing unit 30, and/or an x-ray tube for irradiating the sheets of film. Furthermore, when the film magazine 12 is reinserted in the laser imaging unit 20 after a new film 4 has been placed in the film magazine 12, the central processing unit 29 can determine whether the carrier sheet 6 corresponding to the previous film stack 4 was removed from the film magazine 12. If, for example, the emulsion number or date of manufacture encoded in the bar code 7 did not change after the film magazine 12 was reloaded, an error message such as "remove old carrier sheet from film magazine" can be displayed.

In FIG. 4, the numeral 39 identifies a sheet of film which was removed from the film stack 4 by the suction head 22 and is to be exposed in the laser imaging unit 20. To expose the film 39, image information stored in a memory 31 is transmitted to the exposure control unit 36. The exposure control unit 36 regulates an acoustooptical modulator 34, a laser 32, e.g., a helium-neon laser or a laser diode, and a movable reflector 33. The reflector 33 is here shown as a rotating polygonal reflector but could also be a pivoting reflector. The laser beam, which is modulated by the image information retrieved from the memory 31, is directed onto the film 39 via an f-theta objective 35. The reflector 33 deflects the laser beam along a horizontal direction (fast scan). At the same time, the film 39 is conveyed slowly in a vertical direction by transporting rollers 24 (slow scan). Accordingly, the laser beam exposes the film 39 along rows and columns. Following exposure, the film 39 undergoes a photographic developing process.

Exposure control in the laser imaging unit 20 is carried out with the aid of Look-Up-Tables (LUTs) contained in a memory 37. Different ones of the LUTs correspond to different types of film and, for a particular type of film, the appropriate LUT is selected for exposure control. The data contained in the bar code 7 can represent a specific LUT. If necessary, individual values of an LUT can be recalculated by the central processing unit 29 based on the data read from the bar code 7 and the exposure regulated in accordance with the recalculated values. Furthermore, exposures can be corrected manually by way of a keyboard 38 which is connected to the central processing unit 29.

Figure 5:
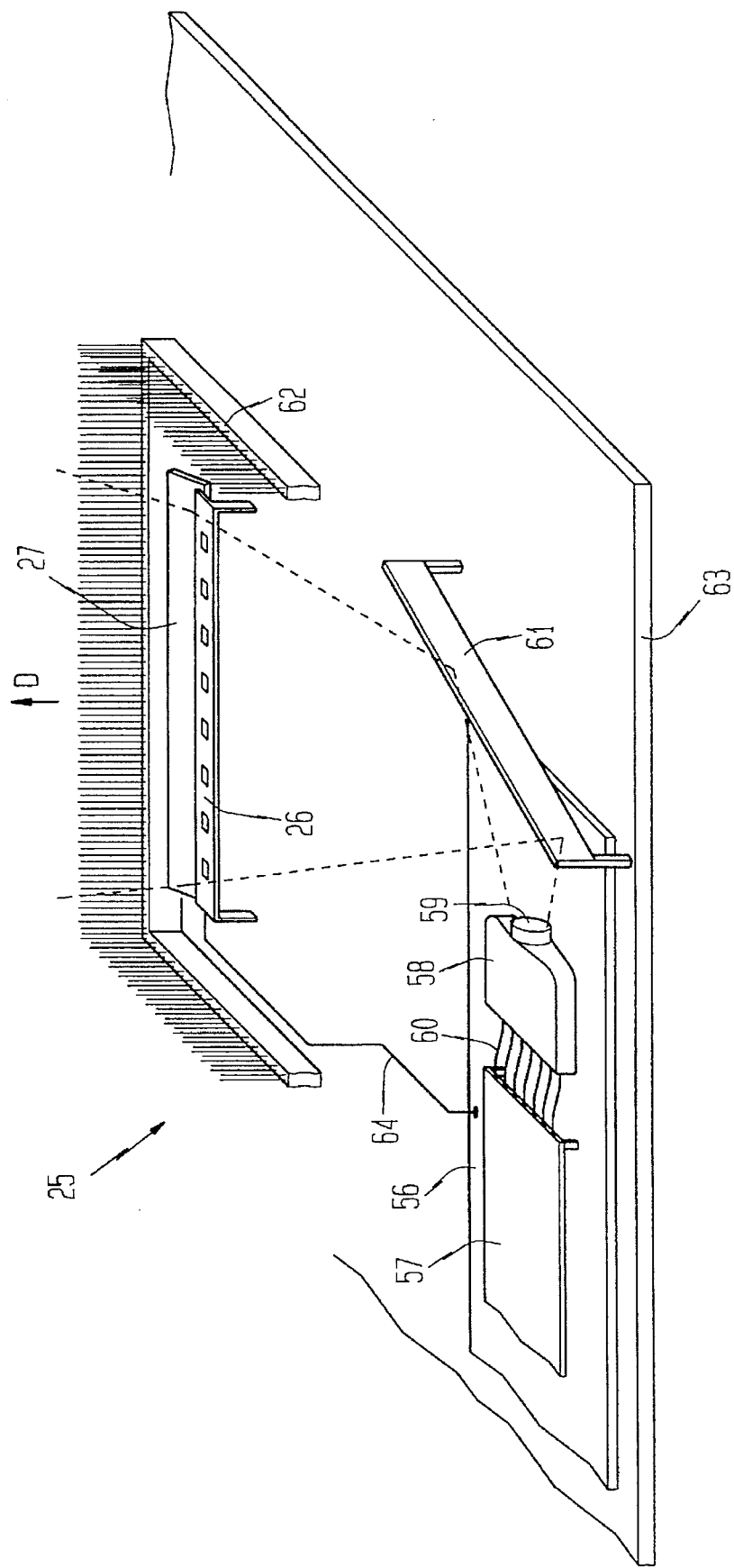
FIG. 5 illustrates a bar code reader constituting part of the exposure unit of FIG. 4.

The bar code reader 25 is illustrated in greater detail in FIG. 5 where it can be seen that the bar code reader 25 is mounted on a support plate 63. The row of light-emitting diodes 26 is arranged to radiate upwards in the direction indicated by the arrow D so that a bar code 7 disposed above the light-emitting diodes 26 is illuminated. On one side of the light-emitting diodes 26 is a reflector 27 which is inclined at about 45 degrees to the plane of the support plate 63. A second reflector 61 is mounted on the support plate 63 to the other side of the light-emitting diodes 26. The reflector 61 is arranged in such a manner that, following reflection by the reflectors 61 and 27, the image field of an objective 59 lies in the plane of the bar code 7. The bent optical path between the objective 59 and the bar code 7 has a length of approximately 87 mm. An optical receiver 58 associated with the objective 59 is connected to an electronic circuit 57 via conductors 60. The circuit 57 is designed to automatically recognize and evaluate different types of bar codes. The light-emitting diodes 26 are supplied with electricity by a conductor 64 which extends from a base plate 56. A black nylon brush 62 is disposed about the light-emitting diodes 26 and serves to shield the surroundings from the light generated by the light-emitting diodes 26. The bristles of the brush 62 are flexible and can lie against the window 19 of a film magazine 12 in a lightproof fashion.

Figure 6:
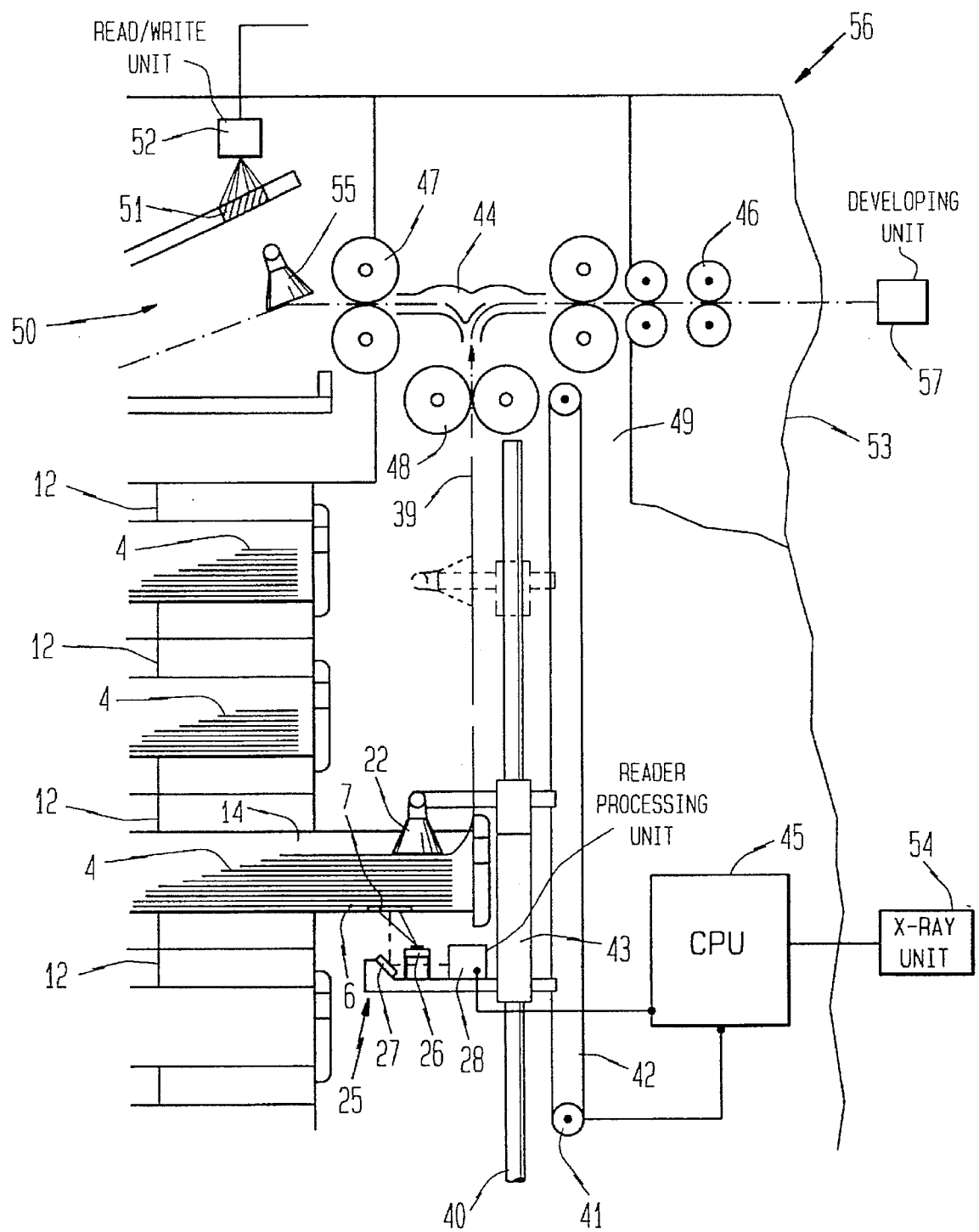
FIG. 6 shows a unit for inserting photosensitive material in and removing photosensitive material from cassettes.

Another film processing unit 56 is shown in FIG. 6 and comprises a unit 53 for loading and unloading x-ray film cassettes. By way of example, such loading/unloading units 53 are marketed by the assignee of the instant application under the name Curix Capacity Plus.

A cassette 50 containing an exposed sheet of x-ray film is introduced into a lighttight area of the loading/unloading unit 53. The cassette 50 is then opened and the exposed x-ray film is removed by means of a suction device including a suction head 55. The exposed x-ray film is conveyed away from the cassette 50 for processing e.g., photographic developing, by means of transporting rollers 46,47. In the present case, the exposed film is sent to a developing unit or section 56 constituting part of the processing unit 56. Processing of the x-ray film can be controlled using data stored in a semiconductor memory 51 carried by the cassette 50. A read/write device or unit 52 reads the stored data and transmits the data to a central processing unit or controller 45.

The loading/unloading unit 53 is provided with several holders for different film magazines 12 containing various types of x-ray film. Each film magazine 12 holds a film stack 4 comprising x-ray film of a specific type, that is, film having a specific format, a specific sensitivity, etc.

The holders for the film magazines 12 are disposed one above the other, and the suction head 22 for withdrawing sheets of film from a film magazine 12 is displaceable vertically along the array of film magazines 12 on a guide rod 40. Displacement of the suction head 22 is effected by a cable 42 which is connected to the suction head 22 and is driven by a motor or drive 41. The motor 41 is controlled by the central processing unit 45 and, when the cassette 50 is to be loaded, the central processing unit 45 causes the suction head 22 to move to the film magazine 12 containing the type of film to be inserted in the cassette 50.

The bar code reader 25 is mounted on a guide plate 43 which is shiftable along the guide rod 40 together with the suction head 22. To this end, the guide plate 43 is connected to the cable 42. Thus, when the suction head 22 is moved to a particular film magazine 12, the bar code reader 25 is likewise moved to such magazine 12.

Once the suction head 22 and bar code reader 25 have been positioned next to the selected film magazine 12, the drawer 14 of the magazine 12 is opened. The suction head 22 and bar code reader 25 are arranged so that the suction head 22 is located above the drawer 14 and the bar code reader 25 is located below the drawer 14. As described previously, the bar code reader 25 reads the bar code 7 on the carrier sheet 6 in the open drawer 14 through the window 19 in the drawer 14. The data obtained from the bar code 7 are sent to the central processing unit 45. Subsequently, the suction head 22 removes the uppermost sheet of film 39 from the film stack 4 in the open drawer 14. The suction head 22 conveys the film 39 along a lightproof duct 49 to a pair of transporting rollers 48 constituting part of a device for loading the cassette 50. The transporting rollers 48 pass the film 39 through a junction 44 and deliver the film 39 to the rollers 47 which load the film 39 into the cassette 50.

The read/write device 52 is connected to the central processing unit 45, and the data derived from the bar code 7 in the open drawer 14 can be entered in the semiconductor memory 51 of the cassette 50 by the read/write device 52. These data can simultaneously be sent to an x-ray unit or section 54 of the processing unit 56 where they can be used to optimally adjust x-ray parameters such as dose, type of radiation, etc. to the particular type of film being employed.

Although the invention has been described with reference to certain preferred embodiments, one skilled in the art will recognize that many modifications are possible. For instance, the data stored in the semiconductor memory 51 of the cassette 50 can also be exposed on the film 39 in the form of a bar code should this be desirable. Additional modifications can also be made within the meaning and range of equivalence of the appended claims.

We claim:

1. A system for handling photosensitive material, comprising a lightproof receptacle enclosing the photosensitive material; a data carrier provided with information about the photosensitive material, said carrier being discrete from, and enclosed in, said receptacle; a receiver for said receptacle, said receiver including a window in register with said information; and a removing device for removing said receptacle from the photosensitive material in said receiver.

2. The system of claim 1, wherein said carrier is sheet-like.

3. The system of claim 1, wherein said carrier is opaque to radiation of at least one wavelength.

4. The system of claim 1, wherein said carrier is disposed between the photosensitive material and said receptacle.

5. The system of claim 4, wherein said carrier has a side which faces said receptacle and said information is provided on said side.

6. The system of claim 1, wherein said information is encoded.

7. The system of claim 6, wherein said information is in the form of a bar code.

8. The system of claim 1 for handling a stack of photosensitive articles enclosed by said receptacle, further comprising a processing unit for the photosensitive articles, said processing unit including a holder for said receiver, and a withdrawing device for withdrawing the photosensitive articles from said receiver one-by-one.

9. The system of claim 8, wherein said withdrawing device comprises a suction head.

10. The system of claim 1, wherein said receiver comprises a first section, and a drawer-like second section mounted on said first section.

11. The system of claim 1, further comprising a processing unit for the photosensitive material, said processing unit including a holder for said receiver, a reader for said information, and a controller for said processing unit, said controller being arranged to receive said information via said reader.

12. The system of claim 1, further comprising a processing unit for the photosensitive material, said receiver being insertable in and removable from said processing unit.

13. The system of claim 1, further comprising an exposure unit for the photosensitive material, said exposure unit including a holder for said receiver, a radiation source for exposing the photosensitive material, a reader for said information, and a controller for said exposure unit, said controller being arranged to receive said information via said reader and to control said exposure unit using said information.

14. The system of claim 13, wherein said source comprises a laser.

15. The system of claim 1 for handling discrete photosensitive sheets enclosed by said receptacle, further comprising a processing unit for the photosensitive material, said processing unit including a first holder for said receiver, a second holder for a cassette, and a transferring device for transferring the photosensitive sheets from said receiver to cassettes.

16. The system of claim 15, wherein said processing unit further includes a reader for said information, an exposure section for the photosensitive sheets, and a controller for said exposure section, said controller being arranged to receive said information via said reader and to control said exposure section using said information.

17. The system of claim 16, wherein said exposure section includes an x-ray source.

18. The system of claim 15, wherein said processing unit further includes a reader for said information, a developing section for developing the photosensitive material following exposure, and a controller for said developing section, said controller being arranged to receive said information via said reader and to control said developing section using said information.

19. The system of claim 1, wherein said carrier comprises cardboard.

20. The system of claim 1, wherein said receptacle has a top side and a bottom side, at least one of said sides being provided with identification of such side.

21. The system of claim 1 for handling a plurality of lightproof receptacles which respectively enclose discrete photosensitive articles, further comprising a plurality of receivers for said receptacles, at least one removing device for removing said receptacles from the photosensitive articles, and a processing unit for the photosensitive articles, said processing unit including a plurality of holders for said receivers, a reader for said information, and a withdrawing device for withdrawing the photosensitive articles from the respective receivers, said withdrawing device being movable between said holders, and said reader being movable with said withdrawing device.

* * * * *